United States Patent
Fuji et al.

(10) Patent No.: US 10,183,893 B2
(45) Date of Patent: Jan. 22, 2019

(54) COMPACT DRYING METHOD

(71) Applicant: NGK Insulators, Ltd., Nagoya (JP)

(72) Inventors: Yusuke Fuji, Nagoya (JP); Kunihiko Yoshioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 594 days.

(21) Appl. No.: 14/861,092

(22) Filed: Sep. 22, 2015

(65) Prior Publication Data

US 2016/0046530 A1    Feb. 18, 2016

Related U.S. Application Data

(63) Continuation of application No. PCT/JP2014/057140, filed on Mar. 17, 2014.

(30) Foreign Application Priority Data

Mar. 26, 2013   (JP) .................. 2013-063133

(51) Int. Cl.
    *C04B 35/638*    (2006.01)
    *B01D 12/00*    (2006.01)
    (Continued)

(52) U.S. Cl.
    CPC ............ *C04B 35/638* (2013.01); *B01D 12/00* (2013.01); *B22F 3/225* (2013.01); *C04B 35/632* (2013.01);
    (Continued)

(58) Field of Classification Search
    CPC ..................................................... B22F 3/225
    See application file for complete search history.

(56) References Cited

U.S. PATENT DOCUMENTS

| 3,901,742 A | 8/1975 | Facaros |
| 4,820,462 A | 4/1989 | Nakajima et al. |
| (Continued) | | |

FOREIGN PATENT DOCUMENTS

| JP | 61-155264 A1 | 7/1986 |
| JP | 02-147202 A1 | 6/1990 |
| (Continued) | | |

OTHER PUBLICATIONS

Machine translation of JPH02-147202 A1 (Japanese document published 1990).*

(Continued)

*Primary Examiner* — Christopher S Kessler
(74) *Attorney, Agent, or Firm* — Burr & Brown, PLLC (57) ABSTRACT

A compact is formed by introducing a slurry containing a ceramic powder or a metal powder, a binder and a solvent into a compaction die, and compacting the slurry in the compaction die. The compact embedded in the compaction die is immersed in an alternative CFC (liquid) (FIG. 4A). The solvent contained in the compact is gradually replaced with the alternative CFC. In the course of this process, the compact separates naturally from the compaction die (releasing is achieved) without receiving an external force. Subsequently, the compact is taken out of the alternative CFC (liquid). The alternative CFC has a boiling point as low as 95° C. at 1 atmospheric pressure. Accordingly, the alternative CFC contained in the compact will volatilize at high speed, thus being removed. Consequently, the compact can be dried in a relatively short time without being heated.

6 Claims, 5 Drawing Sheets

(51) Int. Cl.
  *B22F 3/22*      (2006.01)
  *F26B 5/00*      (2006.01)
  *C04B 35/632*    (2006.01)

(52) U.S. Cl.
  CPC ........ *F26B 5/005* (2013.01); *C04B 2235/602* (2013.01); *C04B 2235/604* (2013.01); *C04B 2235/606* (2013.01); *F26B 2210/02* (2013.01)

(56) References Cited

U.S. PATENT DOCUMENTS

| 5,035,828 A | 7/1991 | Tamura et al. |
| 2009/0209700 A1 | 8/2009 | Kimura et al. |
| 2012/0214942 A1 | 8/2012 | Hiraiwa et al. |

FOREIGN PATENT DOCUMENTS

| JP | 02-289693 A1 | 11/1990 |
| JP | 05-009507 A1 | 1/1993 |
| JP | 10-036894 A1 | 2/1998 |
| JP | 2009-029683 A1 | 2/2009 |
| JP | 4237898 B2 | 3/2009 |
| WO | 2009/104703 A1 | 8/2009 |
| WO | 2012/114865 A1 | 8/2012 |

OTHER PUBLICATIONS

Material Safety Data Sheet Methyl alcohol, Sciencelab.com, 2013.*
English translation of International Preliminary Report on Patentability (Application No. PCT/JP2014/057140) dated Dec. 3, 2015.
International Search Report and Written Opinion (Application No. PCT/JP2014/057140) dated Jun. 10, 2014.
English translation of Argument filed under Article 34 dated Jan. 20, 2015 (Application No. PCT/JP2014/057140).
Second Written Opinion (Application No. PCT/JP2014/057140) dated Mar. 10, 2015.
International Preliminary Report on Patentability (Application No. PCT/JP2014/057140) dated May 22, 2015.
Japanese Office Action (Application No. 2015-508320) dated Aug. 8, 2017 (with English translation).

* cited by examiner

BINDER
CERAMIC POWDER
COMPACT
SOLVENT

FIG. 2B

BINDER
CERAMIC POWDER
SUBSTITUTE CHLOROFLUOROCARBON
COMPACT
SOLVENT

FIG. 2C

BINDER
CERAMIC POWDER
SUBSTITUTE CHLOROFLUOROCARBON
COMPACT

COMPACT DRYING METHOD

BACKGROUND OF THE INVENTION

1. Field of the Invention

The present invention relates to a method for drying a compact.

2. Description of the Related Art

There have been widely known methods for forming a compact by introducing a slurry containing a ceramic powder or a metal powder, a binder, and a solvent capable of dissolving the binder into a compaction die, and compacting the slurry in the compaction die (see, for example, Domestic Re-publication of PCT International Publication No. WO2009/104703). The resulting compact is subjected to a drying step. In the drying step, the solvent contained in the compact is removed, so that the compact is dried.

SUMMARY OF THE INVENTION

In the above-mentioned drying step, it is typical that the compact is heated. Thus, the solvent contained in the compact is volatilized and removed, so that the compact is dried. In this instance, however, drying proceeds gradually from the surface of the compact to the center thereof. In other words, the drying of the compact progresses locally. As a result, stress becomes locally concentrated. Undesirably, this is likely to cause the surface of the compact to become cracked. In addition, if the solvent has a high boiling point, it takes a long time to volatilize the solvent. This undesirably increases the time required to dry the compact.

The present invention is intended to overcome the above-described disadvantages, and an object thereof is to provide a compact drying method in which the time required to dry the compact is relatively short, and in which the surface of the compact is not easily cracked.

The compact drying method according to the present invention is a method for drying a compact formed by compacting a slurry containing a ceramic powder or a metal powder, a binder, and a solvent capable of dissolving the binder.

The compact drying method according to the present invention includes a first step of replacing the solvent contained in the compact with "a liquid that has a boiling point of 95° C. or less at 1 atmospheric pressure and that is compatible with the solvent and does not dissolve the binder" by immersing the compact in the liquid; and a second step of taking the compact out of the liquid after the first step and removing the liquid from the compact by volatilization. A typical example of the "liquid" may be an alternative CFCs (chlorofluorocarbons). Preferably, the solvent has a boiling point of 120° C. or more at 1 atmospheric pressure.

In the first step, the solvent contained in the compact is replaced with the "liquid". This replacement or substitution proceeds within the compact in such a manner that the "liquid" and the solvent dissolve in each other. Also, the "liquid" does not dissolve the binder. The compact therefore can maintain the shape thereof even after the solvent contained in the compact is replaced with the "liquid".

In the second step, the "liquid" contained in the compact is removed by volatilization. Since the boiling point of the "liquid" is 95° C. or less at 1 atmospheric pressure, the "liquid" can be volatilized at a high speed under the conditions of room temperature and normal pressure. In other words, the "liquid" can be removed at a high speed from the inside of the compact without heating the compact for volatilizing the "liquid". Thus, the present invention can provide a compact drying method in which the time required to dry the compact is relatively short, and in which the surface of the compact is not easily cracked.

In the compact drying method according to the present invention, the first step may include a step of separating the compact from a compaction die used for compacting the slurry by immersing the compact embedded in the compaction die in the liquid. The operation of separating (removing) the compact from the compaction die may be hereinafter referred to as "releasing".

In general, "releasing" may be performed by applying an impact to the compaction die for breaking the compaction die, applying ultrasonic vibration to the compaction die, or by inserting an object between the compacting surface of the compaction die and the surface of the compact (see Japanese Patent No. 4237898 and Japanese Unexamined Patent Application Publication No. 2009-029683). These techniques however have a disadvantage that the compact is easily cracked by external force if the compact has a low strength.

On the other hand, the above-described method can achieve "releasing" only by immersing the compact embedded in the compaction die in the above-described "liquid" without applying an external force. The reason is estimated as follows: First, the "liquid", such as an alternative CFC, has the nature of "having a relatively low surface tension and viscosity and a high penetration". Accordingly, the "liquid" can easily penetrate throughout the narrow space between the compacting surface of the compaction die and the surface of the compact. Thus, a thin layer of the "liquid" is formed between the compacting surface of the compaction die and the surface of the compact, thereby allowing "releasing" to proceed and to be completed. Second, the "liquid", such as an alternative CFC, swells a resin component (such as the binder) present within the compact, thereby producing a swelling pressure. This swelling pressure causes a shear stress to develop between the compacting surface of the compaction die and the surface of the compact, thereby allowing "releasing" to proceed and to be completed.

Thus, the present invention can provide a releasing technique in which the compact is not easily cracked even if the compact has a low strength.

In the drying method according to the present invention, the phrase "liquid A compatible with liquid B" implies that 100 cc of liquid A can dissolve 1 cc or more of liquid B; and the phrase "liquid A not compatible with liquid B" implies that 100 cc of liquid A dissolves only less than 1 cc of liquid B. The term "dissolve" used herein means dispersing a solute (typically, the solvent present within the compact) in a solvent (typically, an alternative CFC) to form a uniform phase.

In the drying method according to the present invention, also, the phrase "the liquid does not dissolve the binder" implies that 100 cc of liquid A (typically, the alternative CFC) dissolves only less than 0.5 cc of the binder.

In the drying method according to the present invention, also, it is preferable that the compact is porous and has a porosity of 20% by volume or more and 90% by volume or less. More preferably, the porosity of the compact is 30% by volume or more and 60% by volume or less. If the porosity is "30% by volume or more", the volume of the pores is sufficient to allow the alternative CFC to penetrate into the compact, and time required for the above-described "replacement or substitution" is satisfactorily shortened. If the porosity is "60% by volume or less", a satisfactorily dense sintered compact can be produced by subsequent firing of the compact.

Preferably, when the percentage of the solvent in the compact replaced with the liquid in the first step (ratio of the volume of the liquid currently present within the compact to the volume of the solvent present within the compact before the first step) has reached 85% or more, the second step is started.

In the drying step according to the present invention, also, the alternative CFC used as the "liquid" preferably has a surface tension of 12 mN/m or more and 24 mN/m or less, and a viscosity of 0.3 mPa·s or more and 2 mPa·s or less. The alternative CFC may be hydrofluorocarbon (HFC), hydrofluoroether (HFE), or hydrochlorofluorocarbon (HCFC).

DESCRIPTION OF THE PREFERRED EMBODIMENTS

Embodiments of the present invention (each referred to as the present embodiment) will be described in detail below with reference to the drawings.

First Embodiment

A first embodiment relates to a method for drying a compact after "releasing" (a compact after being taken out of a compaction die). This compact is formed by introducing a slurry containing a ceramic powder or a metal powder, an organic binder and a solvent into a compaction die, and compacting the slurry in the compaction die. The slurry may contain a plasticizer, a dispersing agent, and so forth, if necessary. The ceramic raw material powder and/or metal powder is the main raw material of the compact. The proportions of the constituents are as follows: the ceramic raw material powder and/or metal powder is 10% to 15% by volume; the organic binder is 5% to 20% by volume; the solvent is 60% to 70% by volume; the plasticizer is 2% to 5% by volume; and the dispersing agent is 2% to 5% by volume. Preferably, the compact is porous. In this instance, the porosity of the compact is preferably 20% by volume or more and 90% by volume or less.

The ceramic raw material powder may be an oxide-based ceramic or a non-oxide-based ceramic. Examples of the ceramic raw material powder that can be used include metal compounds for producing a ceramic having a desired composition through firing, such as zirconium oxide, aluminum oxide, nickel oxide, iron oxide, zinc oxide, manganese oxide, calcium oxide, tin oxide, silicon dioxide, yttrium oxide, cobalt oxide, copper oxide, lanthanum oxide, cerium oxide, chromium oxide, titanium oxide, barium titanate, and strontium titanate; nitrides, such as silicon nitride, titanium nitride, and aluminum nitride; and carbides, such as silicon carbide and titanium carbide. The particle size of the ceramic raw material powder is not particularly limited as long as the slurry can be prepared (in other words, as long as the powder can be stably dispersed in a solvent).

The metal powder is not particularly limited as long as it is electrically conductive. Examples of the metal powder that can be used include powders of nickel, palladium, platinum, gold, silver, copper, tungsten, molybdenum, and alloys thereof. These metal powders may be used singly or in combination.

The organic binder is not particularly limited as long as it can be dissolved in a solvent. Examples of the organic binder that can be used include butyral-based binders, such as polyvinyl butyral; acrylic binders, such as butyl acrylate and butyl methacrylate; cellulose-based binders, such as ethyl cellulose and methyl cellulose; and urethane resin, phenol resin, and epoxy resin. Alternatively, there may be used a urethane precursor capable of producing a urethane resin by a chemical reaction, represented by isocyanate and polyol.

The solvent is not particularly limited as long as it can dissolve, for example, the organic binder, the plasticizer, and the dispersing agent. Examples of the solvent include alcohols (methanol, ethanol, isopyl alcohol, butanol, octanol, 2-ethylhexanol, etc.), ethers (2-methoxyethanol, ethylene glycol monoethyl ether, ethylene glycol monobutyl ether, diethylene glycol dimethyl ether, diethylene ether, diethylene glycol monobutyl ether, etc.), ketones (acetone, methyl ethyl ketone, methyl isobutyl ketone, diisobutyl ketone, etc.), esters, and dibasic acid esters (ethyl acetate, butyl acetate, dimethyl glutarate, triacetin, ethylene glycol monomethyl ether acetate, ethylene glycol monobutyl ether acetate, diethylene glycol monoethyl ether acetate, diethylene glycol monobutyl ether acetate, propylene glycol monomethyl ether acetate, etc.), hydrocarbons (toluene, xylene, cyclohexane, etc.), N-methyl-2-pyrrolidone, N,N-dimethylformamide, and sulfolane. These solvents may be used singly or in combination.

Preferably, the solvent has a boiling point of 120° C. or more at 1 atmospheric pressure. Among the above-cited solvents, those having a boiling point of 120° C. or more at 1 atmospheric pressure are alcohols (octanol, 2-ethylhexanol), ethers (2-methoxyethanol, ethylene glycol monoethyl ether, ethylene glycol monobutyl ether, diethylene glycol dimethyl ether, diethylene glycol monobutyl ether), ketones (diisobutyl ketone), esters, and dibasic esters (butyl acetate, dimethyl glutarate, triacetin, ethylene glycol monomethyl ether acetate, ethylene glycol monobutyl ether acetate, diethylene glycol monoethyl ether acetate, diethylene glycol monobutyl ether acetate, propylene glycol monomethyl ether acetate), and hydrocarbons (xylene).

Examples of the plasticizer that can be used include phthalic acid derivatives, isophthalic acid derivatives, tetrahydrophthalic acid derivatives, adipic acid derivatives, maleic acid derivatives, fumaric acid derivatives, stearic acid derivatives, oleic acid derivatives, itaconic acid derivatives, and ricinoleic derivatives. Among these, phthalic acid derivatives are suitable. More specifically, phthalic acid derivatives that can be used include dimethyl phthalate, diethyl phthalate, dibutyl phthalate, di-(2-ethylhexyl) phthalate, dioctyl phthalate, diisooctyl phthalate, diisobutyl phthalate, diheptyl phthalate, and diphenyl phthalate.

Examples of the dispersing agent that can be used include polycarboxylic acid-based copolymers, polycarboxylates, sorbitan fatty acid esters, polyglycerol fatty acid esters, phosphoric acid ester salt-based copolymers, sulfonate-based copolymers, and polyurethane polyester-based copolymers having a tertiary amine. Polycarboxylic acid-based copolymers and polycarboxylates are particularly suitable. By adding a dispersing agent, the slurry to be subjected to compaction can have a low viscosity and a high flowability.

Figure 1A:
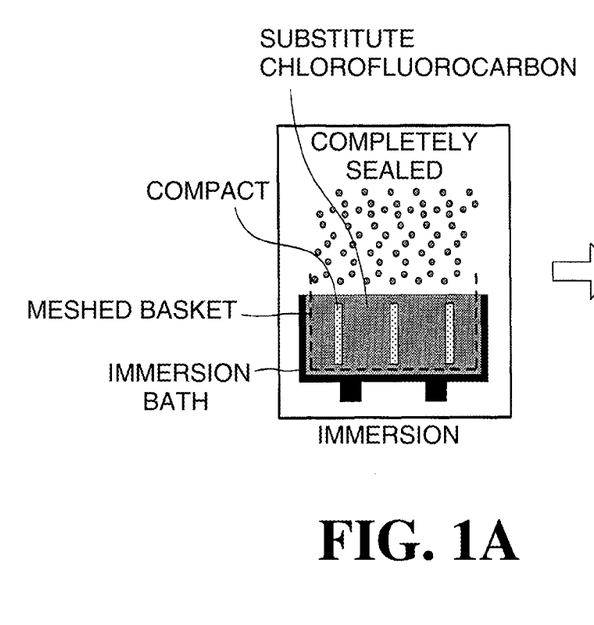
FIGS. 1A-1B show diagrams illustrating a procedure for drying a compact by a compact drying method according to the present invention.

As shown in FIG. 1A, an immersion bath is enclosed in a space (filled with, for example, air) in a completely sealed system having room temperature and normal pressure. This immersion bath is filled with an alternative CFC (liquid), and a meshed basket is immersed in the alternative CFC. Hydrofluorocarbon (HFC), hydrofluoroether (HFE), or hydrochlorofluorocarbon (HCFC) may be used as the alternative CFC. The alternative CFC has a boiling point of 95° C. or less at 1 atmospheric pressure. Also, the alternative CFC is compatible with the solvent present in the compact, but does not dissolve the organic binder. Since the boiling point of the alternative CFC is 95° C. or less at 1 atmospheric pressure, the alternative CFC can volatilize at a high speed in the space having room temperature and normal pressure. Since the space is, however, completely sealed, the alternative CFC is not released from the space to the outside. The boiling point of the alternative CFC is preferably 30° C. or more at 1 atmospheric pressure.

The alternative CFC is preferably such that 100 cc thereof can dissolve 5 cc or more, more preferably 20 cc or more, of the solvent in the compact. In this instance, the time required for the above-described "replacement or substitution" can be further shortened. The alternative CFC is preferably such that 100 cc thereof can dissolve only less than 0.5 cc, more preferably less than 0.2 cc, of the binder. The use of such an alternative CFC enables the compact to have a strength sufficient to maintain the shape thereof.

In the first embodiment, first, the compact after being subjected to the above-described "releasing" is immersed in the alternative CFC in the meshed basket, as shown in FIG. 1A. In this instance, preferably, the entire compact is completely immersed. Preferably, the proportion of the total volume of the compact immersed in the alternative CFC (liquid) (in the case of FIGS. 1A-1B, the sum of the volumes of three compacts) is 20% or less relative to the total volume of the alternative CFC filling the immersion bath.

Figure 2A:
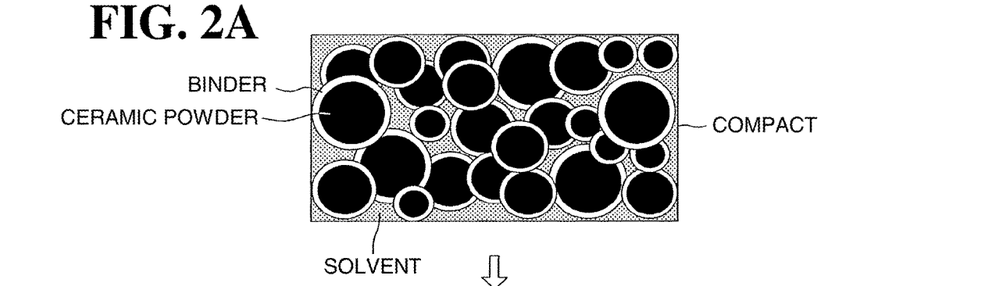
FIGS. 2A-2C show representations illustrating states of a portion within the compact where the solvent contained therein is being replaced with an alternative CFC.
Figure 2B:
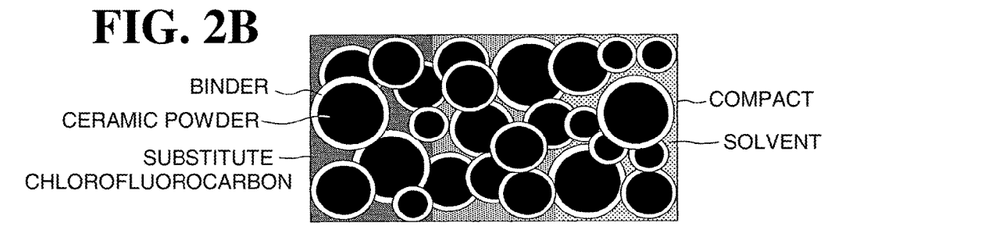
Figure 2C:
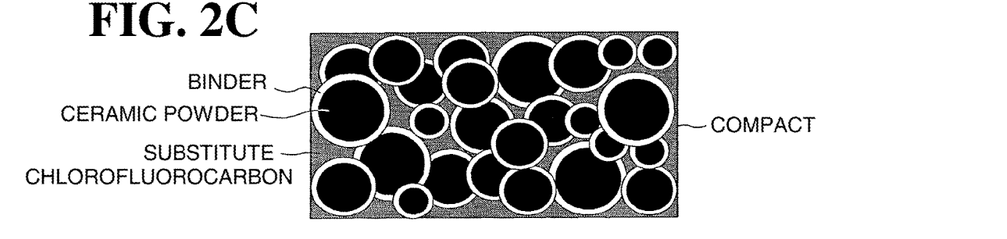

The alternative CFC gradually substitutes for the solvent in the compact over the time period of the immersion of the compact in the alternative CFC, as shown in FIGS. 2A-2C (see the figures in the following order: FIG. 2A→FIG. 2B→FIG. 2C). This substitution proceeds within the compact in such a manner that the alternative CFC dissolves the solvent. In addition, the alternative CFC does not dissolve the binder. Therefore the compact can maintain the shape thereof even after the solvent in the compact has been replaced with the alternative CFC.

The time for which the compact is immersed in the alternative CFC (the immersion time of the compact) is, for example, in the range of 15 minutes to 120 minutes. For example, the immersion time may be set so that the proportion of the solvent within the compact replaced with the alternative CFC (ratio of the volume of the alternative CFC currently present within the compact to the volume of the solvent present within the compact before the immersion) reaches 85% or more.

Figure 1B:
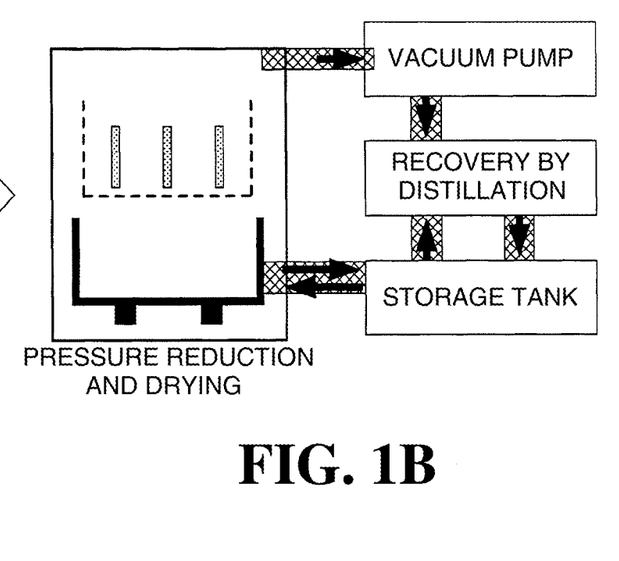

Then, the meshed basket is lifted out of the immersion bath so that the compact is taken out of the alternative CFC (liquid), as shown in FIG. 1B. In this embodiment, in addition, the alternative CFC that has filled the immersion bath is transferred to a storage tank outside the above-mentioned space. Furthermore, this space is evacuated with a vacuum pump (so that the pressure in the space is reduced to a level lower than normal pressure). The pressure in this space may be kept at normal pressure.

As described above, the boiling point of the alternative CFC is 95° C. or less at 1 atmospheric pressure. Such an alternative CFC can volatilize at high speed even under the conditions of room temperature and normal pressure. In addition, since the space is evacuated in this embodiment, the alternative CFC volatilizes at a higher speed than in the case of normal pressure. Accordingly, the alternative CFC present within the compact taken out out of the alternative CFC as described above volatilizes at a high speed and is thus removed from the inside of the compact. Consequently, the compact is dried. The time for which the alternative CFC remaining within the compact volatilizes until it is completely removed is, for example, in the range of 1 minute to 15 minutes. The volatilized alternative CFC (gas) is recovered by distillation and transferred to a storage tank through a vacuum pump.

According to the first embodiment, the alternative CFC can be removed at a high speed from the inside of the compact without heating the compact for volatilizing the alternative CFC. Thus, there is provided a compact drying method in which the time required to dry the compact is relatively short, and in which cracks caused by heating the compact are unlikely to occur.

As the alternative CFC evaporates, the temperature of the above-mentioned space decreases corresponding to the latent heat (heat of vaporization) of the alternative CFC. In order to keep the temperature of the space constant, the space may be heated to the extent corresponding to the latent heat (heat of vaporization) of the alternative CFC.

Second Embodiment

A second embodiment will now be described. The second embodiment is different from the first embodiment, in which the compact having been subjected to "releasing" (the compact taken out of the compaction die) is immersed in the alternative CFC, only in that the compact before being subjected to "releasing" (the compact embedded in the compaction die) is immersed in the alternative CFC. In the following description, only the differences of the second embodiment from the first embodiment will be described.

Figure 3:
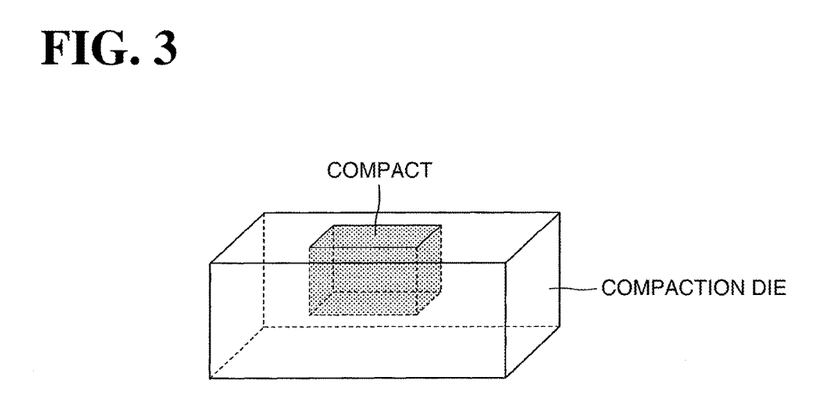
FIG. 3 is a representation illustrating a state where the compact is embedded in a compaction die.

In the second embodiment, if the compaction die includes so dense a member that the alternative CFC cannot penetrate therethrough (member having a low porosity), it is required that the surface of the compact be partially exposed to the outside in a state where the compact is embedded in the compaction die, as shown in FIG. 3. This is intended to provide a port through which the alternative CFC enters the inside of the compact. In the second embodiment, if the compaction die includes a porous member sufficient to allow the alternative CFC to penetrate therethrough (member having a high porosity), a part of the surface of the compact is not necessarily exposed. This is because the alternative CFC can enter the compact through the pores in the compaction die.

Figure 4A:
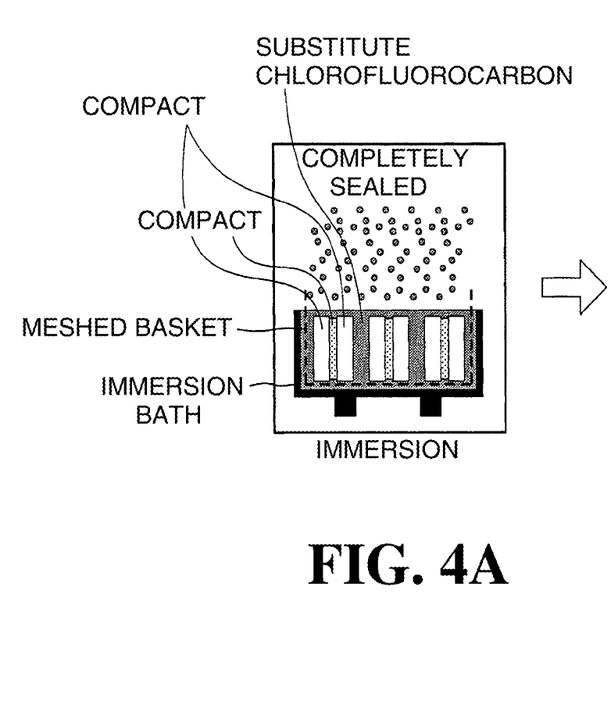
FIGS. 4A-4B show diagrams corresponding to FIGS. 1A-1B, illustrating the case of immersing the compact in an alternative CFC, wherein the compact is embedded in a compaction die used for compacting a slurry.
Figure 4B:
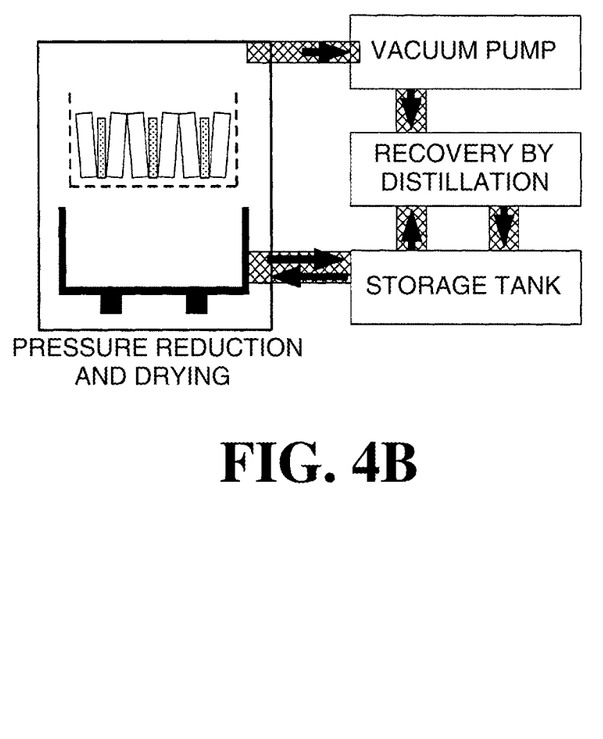
Figure 5A:
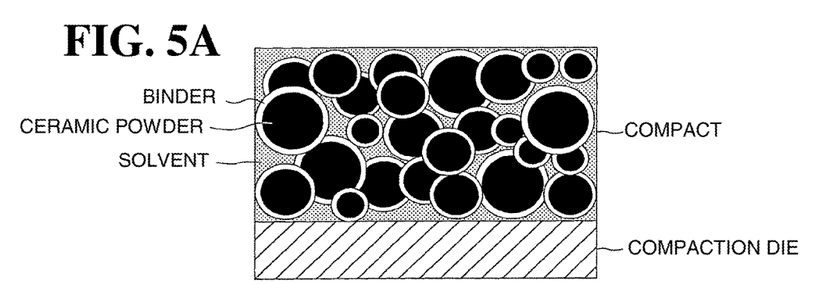
FIGS. 5A-5C show representations corresponding to FIGS. 2A-2C, illustrating states where the compact is being separated from the compaction die in the case of FIGS. 4A-4B.
Figure 5B:
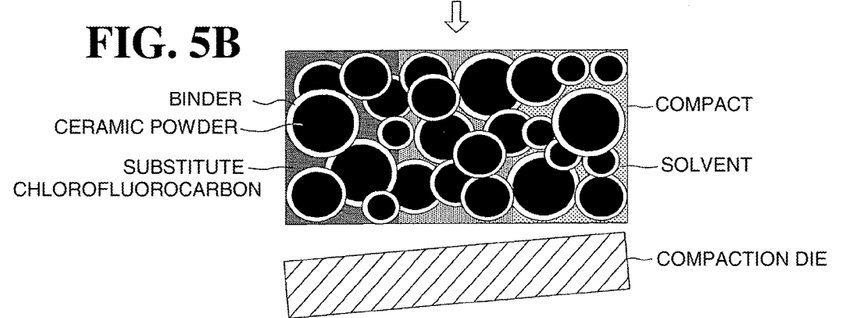
Figure 5C:
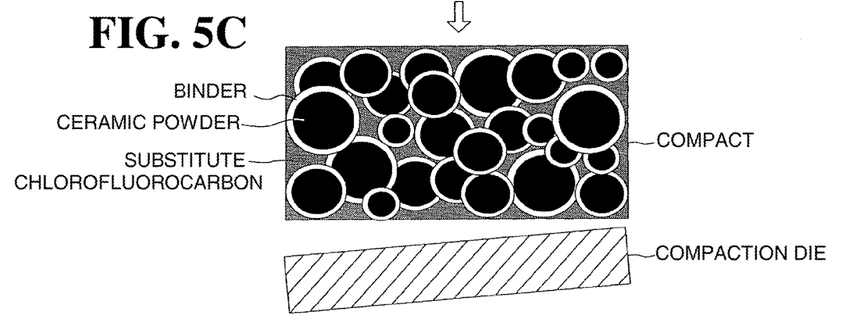

In the second embodiment, the compact before being subjected to "releasing" is immersed in the alternative CFC (liquid), as shown in FIGS. 4A and 4B corresponding to FIGS. 1A and 1B, respectively (see particularly FIG. 4A). Consequently, the alternative CFC gradually substitutes for the solvent in the compact over the time period of the immersion of the compact in the alternative CFC, as shown in the figures in the order of FIGS. 5A, 5B and 5C corresponding to FIGS. 2A, 2B and 2C, respectively.

Thus, in a stage of the process of gradually replacing the solvent in the compact with the alternative CFC, the compact separates naturally from the compaction die without applying an external force. In the embodiment shown in FIGS. 5A-5C, the compact separates naturally from the compaction die in the stage of FIG. 5B. In other words, "releasing" is naturally achieved without receiving an external force. The reason is estimated as follows.

First, the alternative CFC has the property of "having a relatively low surface tension and viscosity and a high penetration". Accordingly, the alternative CFC (liquid) can easily penetrate throughout the narrow space between the compacting surface of the compaction die and the surface of the compact. Thus, a thin layer of the alternative CFC is formed between the compacting surface of the compaction die and the surface of the compact, thereby allowing "releasing" to proceed and to be completed. Second, the alternative CFC (liquid) swells a resin component (such as the binder) present within the compact, thereby producing a swelling pressure. This swelling pressure causes a shear stress to develop between the compacting surface of the compaction die and the surface of the compact, thereby allowing "releasing" to proceed and to be completed.

After the "releasing" is completed, the compact is dried according to the same procedure as in the first embodiment.

Thus, the second embodiment provides a releasing technique in which the compact is not easily cracked even if the compact has a low strength, in addition to producing the same advantageous effects as in the first embodiment.

The present application claims priority from Japanese patent application No. 2013-063133 filed on Mar. 26, 2013, the entire contents of which are incorporated herein by reference.

What is claimed is:

1. A compact drying method for drying a compact produced by compacting a slurry containing a ceramic powder or a metal powder, a binder, and a solvent capable of dissolving the binder, the method including:
   a first step of replacing the solvent contained in the compact with a liquid that has a boiling point of 95° C. or less at 1 atmospheric pressure, which is compatible with the solvent and does not dissolve the binder, by immersing the compact in the liquid under normal pressure while a surface of the compact is partially exposed outside in a state where the compact is embedded in a compaction die for compacting the slurry, and allowing spontaneous separation of the compact from the compaction die while the compact is immersed in the liquid, the compaction die being composed of a material having a density that does not allow penetration of the liquid to the inside; and
   a second step of taking the compact out of the liquid after the first step and removing the liquid from the compact by volatilization.

2. The compact drying method according to claim 1, wherein the liquid is one of hydrofluorocarbon, hydrofluoroether and hydrochlorofluorocarbon.

3. The compact drying method according to claim 1, wherein the solvent has a boiling point of 120° C. or more at 1 atmospheric pressure.

4. The compact drying method according to claim 1, wherein the binder is a urethane precursor that produces a urethane resin by a chemical reaction.

5. The compact drying method according to claim 1, wherein the second step is performed under a pressure which is lower than normal pressure.

6. The compact drying method according to claim 1, wherein the solvent is dibasic acid ester and the liquid is hydrofluoroether.

* * * * *